United States Patent
Caffrey et al.

(10) Patent No.: US 8,214,693 B2
(45) Date of Patent: Jul. 3, 2012

(54) DAMAGED SOFTWARE SYSTEM DETECTION

(75) Inventors: James M. Caffrey, Woodstock, NY (US); Karla K. Arndt, Rochester, MN (US); Aspen L Payton, Byron, MN (US); Keyur Patel, Poughkeepsie, NY (US); Robert L. Snyder, Rosendale, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 12/350,518

(22) Filed: Jan. 8, 2009

(65) Prior Publication Data

US 2010/0174947 A1 Jul. 8, 2010

(51) Int. Cl.
*G06F 11/00* (2006.01)
(52) U.S. Cl. ...................... 714/38.1; 714/47.2
(58) Field of Classification Search .............. 714/38, 714/47.2, 38.1, 38.11, 38.12, 38.13, 38.14
See application file for complete search history.

(56) References Cited

U.S. PATENT DOCUMENTS

| | | | |
|---|---|---|---|
| 6,885,950 B2 * | 4/2005 | Mitsutake et al. | 702/58 |
| 7,076,695 B2 * | 7/2006 | McGee et al. | 714/47.2 |
| 7,269,824 B2 | 9/2007 | Noy et al. | |
| 7,380,171 B2 | 5/2008 | Prescott et al. | |
| 2004/0019878 A1 | 1/2004 | Kotnur et al. | |
| 2006/0195745 A1 * | 8/2006 | Keromytis et al. | 714/741 |
| 2006/0200278 A1 | 9/2006 | Feintuch | |
| 2006/0294095 A1 | 12/2006 | Berk et al. | |
| 2007/0055914 A1 * | 3/2007 | Chandwani et al. | 714/47 |
| 2007/0101202 A1 | 5/2007 | Garbow | |
| 2007/0174816 A1 | 7/2007 | Cavanaugh et al. | |
| 2007/0233782 A1 | 10/2007 | Tali | |
| 2007/0283338 A1 | 12/2007 | Gupta et al. | |
| 2008/0104455 A1 | 5/2008 | Ramarajar et al. | |

OTHER PUBLICATIONS

Frederick T. Sheldon et al., "Assessing the Effect of Failure Severity, Coincident Failures and usage-Profiles on the Reliability of Embedded Control Systems" SAC'04, Mar. 14-17, 2004, pp. 8, Nicosia, Cyprus.
George K. Baah et al. "On-line Anomaly Detection of Deployed Software: A statistical Machine Learning Approach", SOQUA'06, Nov. 6, 2006, Portland OR, USA. pp. 8.

* cited by examiner

*Primary Examiner* — Robert Beausoliel, Jr.
*Assistant Examiner* — Joseph Kudirka
(74) *Attorney, Agent, or Firm* — Cantor Colburn LLP; William A. Kinnaman, Jr.

(57) ABSTRACT

Damage to a software stack accessed by multiple application programs can be detected by monitoring the rate of stack failures at the stack via a stack monitor and comparing the rate of stack failures with a time related threshold. An alarm is generated when the rate of stack failures exceeds the time related threshold.

8 Claims, 4 Drawing Sheets

DAMAGED SOFTWARE SYSTEM DETECTION

BACKGROUND

The present invention relates to computers, and more specifically, to the detection of a damaged software system within a computing system.

In many applications, such as those involving mainframe computers (or servers), resiliency with respect to crashes is highly important. Accordingly, systems employed in such applications are designed to be able to manage multiple failures related to the software applications being run on the system without affecting the system as a whole.

An example of such a highly resilient system may be found, for example, in the software stack of a mainframe computer. A "software stack" is a set of programs that work together to produce a result, for example, an operating system and its applications. It may also refer to any group of applications that work in sequence toward a common result or to any set of utilities or routines that work as a group. Of course, the resiliency could exist in other contexts, such as a personal computer, as well.

When a highly resilient system like a mainframe software stack is damaged by a software defect it frequently generates a high rate of critical failures caused by either recurring or recursive failures leading to abnormal ends (abends). Such systems, however, can survive multiple failures often without the failure being visible to the operations team or the users of the services provided by the stack. Given that these highly resilient systems can survive a significant number of failures, operations teams and system users have become used to some number of these failures as normal behavior. However, the combination of these failures and some other event can cause the stack to fail. If the number of failures is excessive (i.e., abnormal behavior), then the stack could fail due to the cumulative effects of all these failures.

SUMMARY

According to one embodiment of the present invention, a computer implemented method is provided for a computer including a processor having a software stack accessed by multiple application programs. The method includes receiving software requests from the multiple applications at the software stack; monitoring the rate of stack failures at the stack via a stack monitor; comparing the rate of stack failures with a time related threshold; and generating an alarm when the rate of stack failures exceeds the time related threshold.

Another embodiment of the present invention is directed to a computer system for monitoring software stack failures. The system includes a stack configured to be accessed by multiple application programs and to provide access to resources of the computer system to the multiple programs. The system also includes a stack monitor coupled to the stack configured to monitor the rate of stack failures and a memory unit containing time based historical failure rate information. The system also includes a system monitor coupled to the stack monitor and the memory unit and configured to compare the rate of stack failures with the time based historical rate and to generate an alarm when the rate exceeds the historical rate.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention are directed to detecting when the software stack has been damaged. In the prior art, the problem is to accurately detect when the arrival rate of critical failures indicates that the software stack has been damaged. The arrival rate of failures varies with time (prime shift versus off shift) and workload (production versus testing systems). Without an effective way to set a threshold (expected—normal rate of failures), it is not possible to use the arrival rate of failures to detect a damaged software stack. Accordingly, embodiments of the present invention are directed to monitoring the rates of software stack failures and varying thresholds of "acceptable" failure rates that vary based on time.

One embodiment of the present invention may utilize historical system data to set (and alter, in some cases) an adaptive, dynamic threshold (expected value) to detect when the executing software stack has been damaged. This threshold may be adapted based on "machine learning" that makes a prediction of the normal behavior of the software stack and compare observed behavior versus predicted behavior using the metric/sensor information. The threshold is preferably a function of time such as time of day, day of the week or month, etc., and it will be understood that the threshold will change over time. That is, the work run on the software stack is changing over time so that the prediction of the expected value also need to change over time When this adaptive, dynamic threshold has been exceeded, an alarm may be generated indicating that the stack has been damaged. In one embodiment, the threshold is based on historical, time varying information related to the arrival rate of acceptable stack failures during a given operating time period. Further, the historical data may be subjected to standard statistical techniques to define the level of certainty that the measured arrival rate is caused by a problem rather than, for example, normal operating conditions.

Example of failures that may be of interest include, but are not limited to, memory access failures, invalid states, resource overflow or depletion, buffer overruns, or invalid resource requests. The failures may be measured by Logrec entries, SVC (core) or SYSM (system) dumps or other standard means of capturing data to diagnose problems. An SVC dump is a core dump initiated by the operating system generally when a programming exception occurs. SVC dump processing stores data in dump data sets that are pre-allocate, or that the system allocates automatically as needed. A SYSM is a so-called "system dump" and is well known in the art. Of course, other means may be available for detecting and measuring such failures.

Figure 1:
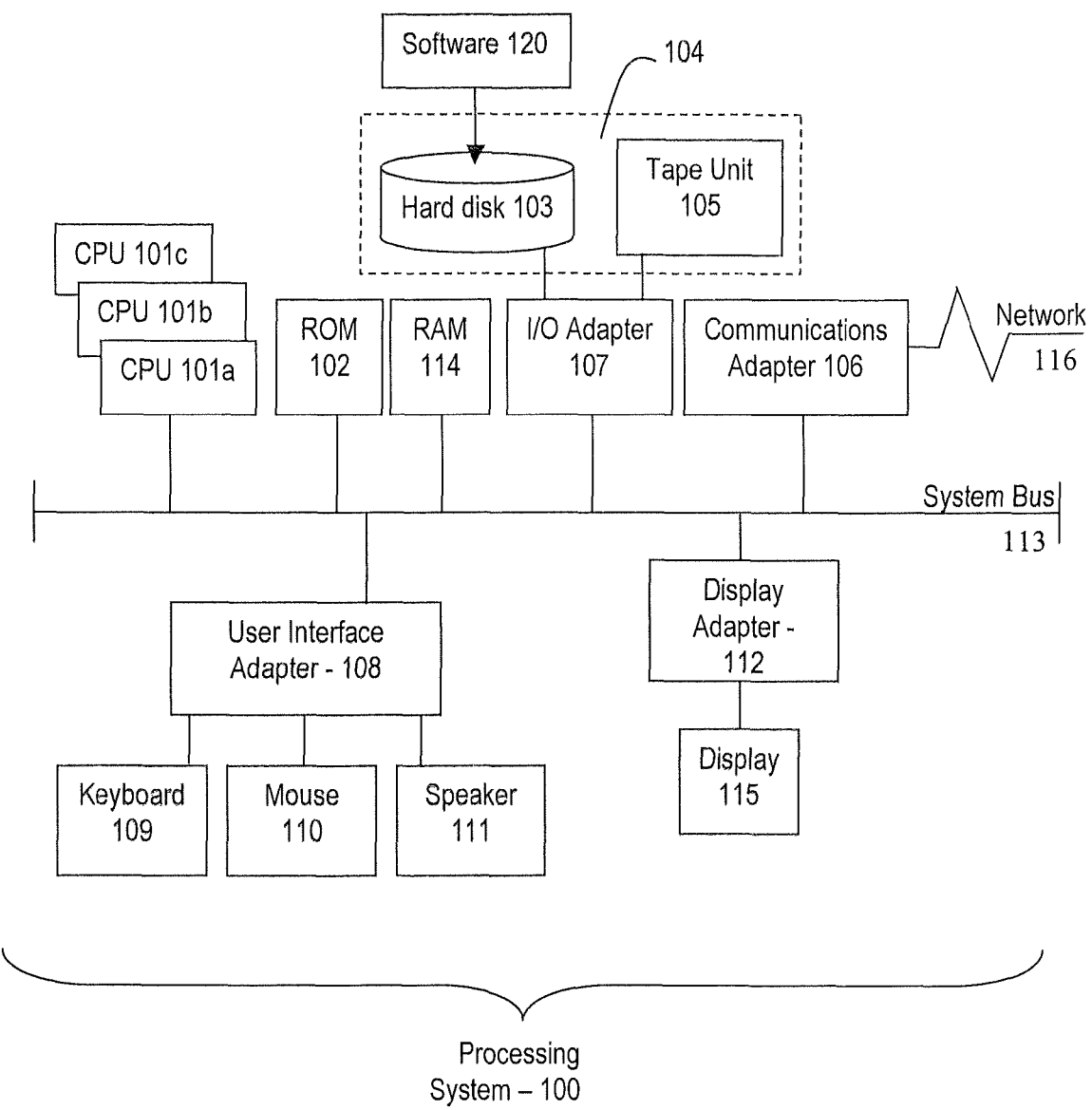
FIG. 1 shows an example of a computing system according to an embodiment of the present invention.

FIG. 1 shows an embodiment of a computing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

The system may also include an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. In one embodiment, the mass storage may include or be implemented as a database for storing enterprise architecture information. A network adapter 106 interconnects bus 113 with an outside network 116 enabling system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI) and PCI Express. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. Of course, the operating systems listed above may be executing in a virtualized environment.

The system 100 also includes a network adapter 106 for communicating over a network 116. The network can be a local-area network (LAN), a metro-area network (MAN), or wide-area network (WAN), such as the Internet or World Wide Web.

Users of the system 100 can connect to the network 116 through any suitable network adapter 106, such as standard telephone lines, digital subscriber line, LAN or WAN links (e.g., T1, T3), broadband connections (Frame Relay, ATM), and wireless connections (e.g., 802.11(a), 802.11(b), 802.11 (g)).

As disclosed herein, the system 100 includes machine readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. The software 120 may include various tools and features for providing user interaction capabilities as are known in the art.

Figure 2:
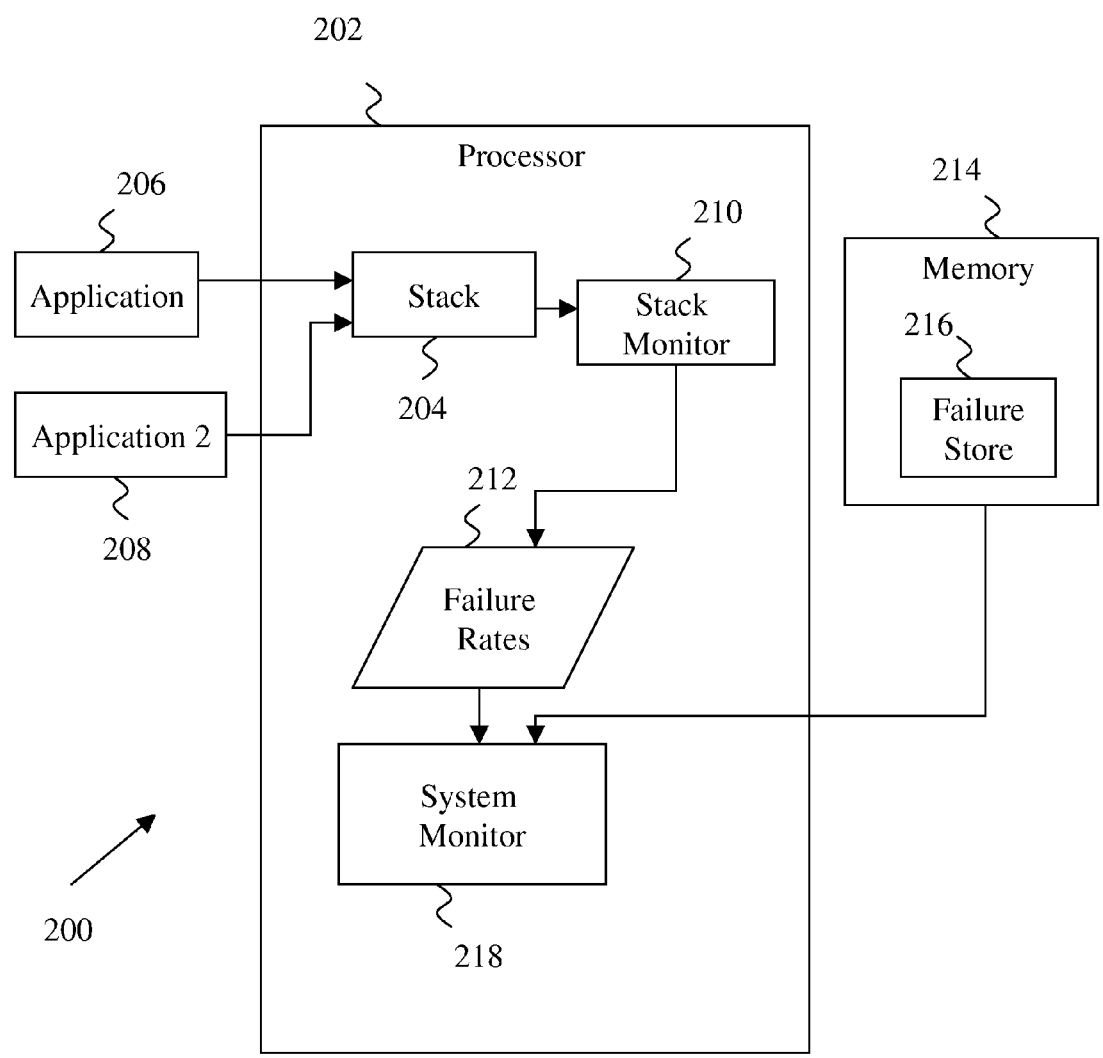
FIG. 2 shows another example of a computing system according to an embodiment of the present invention.

FIG. 2 shows an example of a computing system 200 configured in accordance with one embodiment of the present invention. The computing system may be implemented, for example, on the system 100 shown in FIG. 1. The computing system 200 includes a processor 202 that handles the computations and other operations. The processor 202 includes a software stack 204. The software stack 204 may include and is coupled to a first application 206 and a second application 208. These applications may include, but are not limited to, an operating system, a particular software program, and the like.

Coupled to the stack 204 is a stack monitor 210. The stack monitor 204 may be comprised of sensors utilized by the operating system to identify failures during a particular time period. These failures may be referred to as "soft failures." These soft failures may be result from a damaged system or the exhaustion of shared, constrained resources. The stack monitor 210 may utilize existing functions of the operating system that already capture data about the software stack 204. In one embodiment, the stack monitor 204 may examine SVC Dumps, Logrec records or SYSM Dumps to produce failure rates 212 of the currently operating system. Of course, the stack monitor 204 could also, for accounting errors, monitor SMF records.

Information collected by the stack monitor 210 may also be stored in a failure store 216 that is part of a memory 214. This information may be subjected to statistical analysis to create a historical compilation of operating failure rates at specific time periods. This may be described as process by which information may be collected as sensor information to create a metric (the threshold) that describes normal behavior of the software stack.

The processor may also include a system monitor 218. The system monitor 218 may be configured to compare the current failure rates 212 to thresholds in the failure store 216 to determine if the current failure rates 212 exceed the thresholds. In the event they do, an alarm may be activated. It will be understood that the thresholds used vary over time and are selected based on the particular circumstance. For example, the time of day, day of the month, or any other time based selection criteria may be used to select the threshold that corresponds to the particular "real-time" values being measured and compared.

Figure 3:
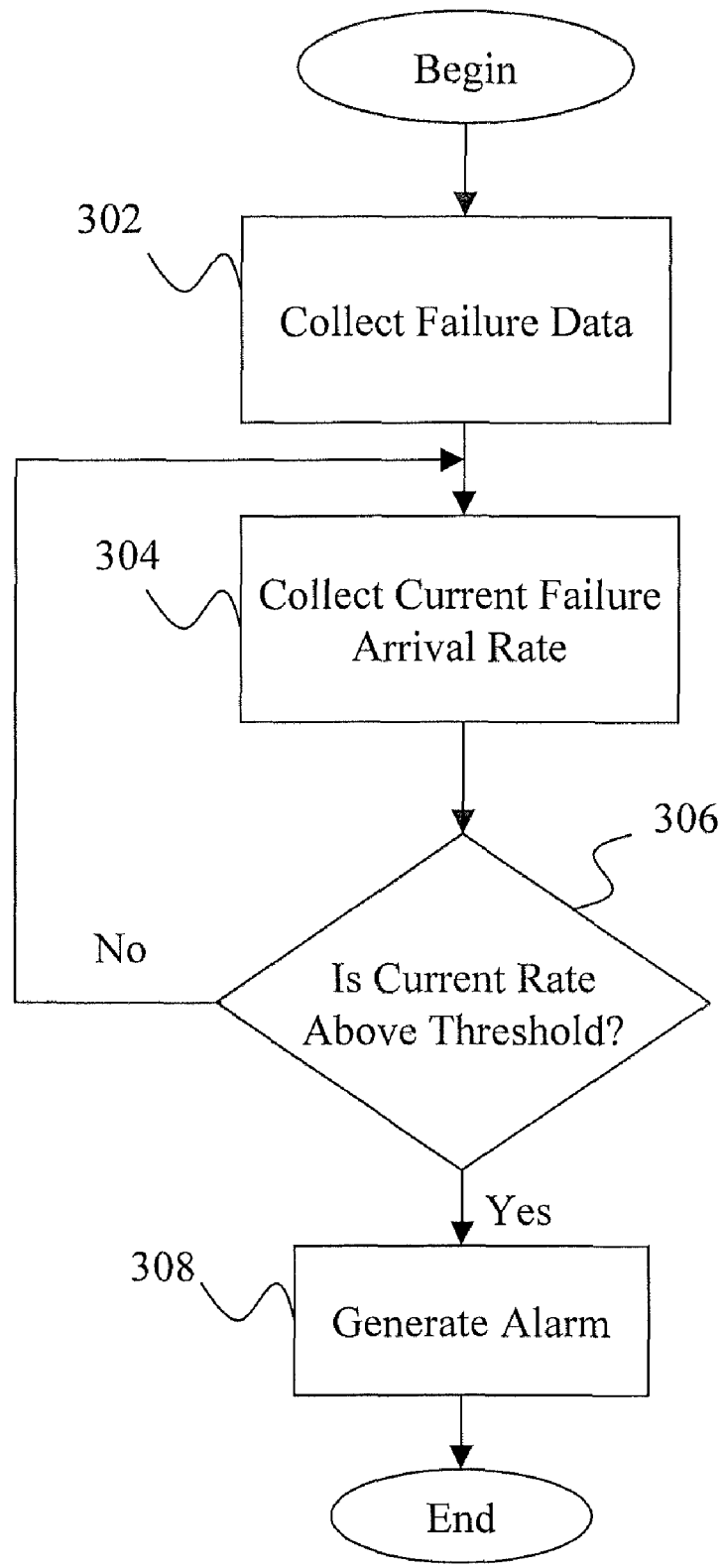
FIG. 3 shows a method of monitoring failure rates according to one embodiment of the present invention.

FIG. 3 shows a flow chart of a method according to one embodiment of the present invention. At a block 302 failure data is collected. This data may be collected, for example, by operating the computing systems and storing the results of periodic Logrec entries, SVC or SYSM dumps. In one embodiment, statistical analysis may be performed on the collected data to create time-based arrival thresholds. That is, typical failure rates that are correlated to specific time periods may be collected, analyzed and stored. The number of samples and time period over which the information is gathered may vary and may depend on the criticality of a particular system and its tolerance to crashes.

At a block 304 current failure arrival rates are collected. This could include receiving current Logrec entries, SVC or SYSM dumps. The rate of arrival may be determined, for example, by determining the number of failures in a dump and the time since the last dump that was examined. Regardless of how the rate is determined, at a block 306 it is determined if the failure arrival rate for a particular time exceeds the threshold for that particular time period. For example, the rate of failure at one time may be less than at others. The thresholds, as described above, may be taken from particular time periods based on historical data. For example, at a first time period of low activity, the rate of failures may be much lower than at a second time where the activity rate is higher. Because of the lower activity, a lower failure rate may be expected. Accordingly, if the threshold for failure rates may be lower at this time because with less activity, less failures are expected and a lower rate may indicate that a major problem is developing or exists.

In the event that the current arrival rate exceeds the threshold, an alarm may be generated at a block 308. The generation of the alarm may include displaying or otherwise notifying a system administrator or the like of the alarm condition. In the event that the threshold is not exceed, processing returns to block 304.

Figure 4:
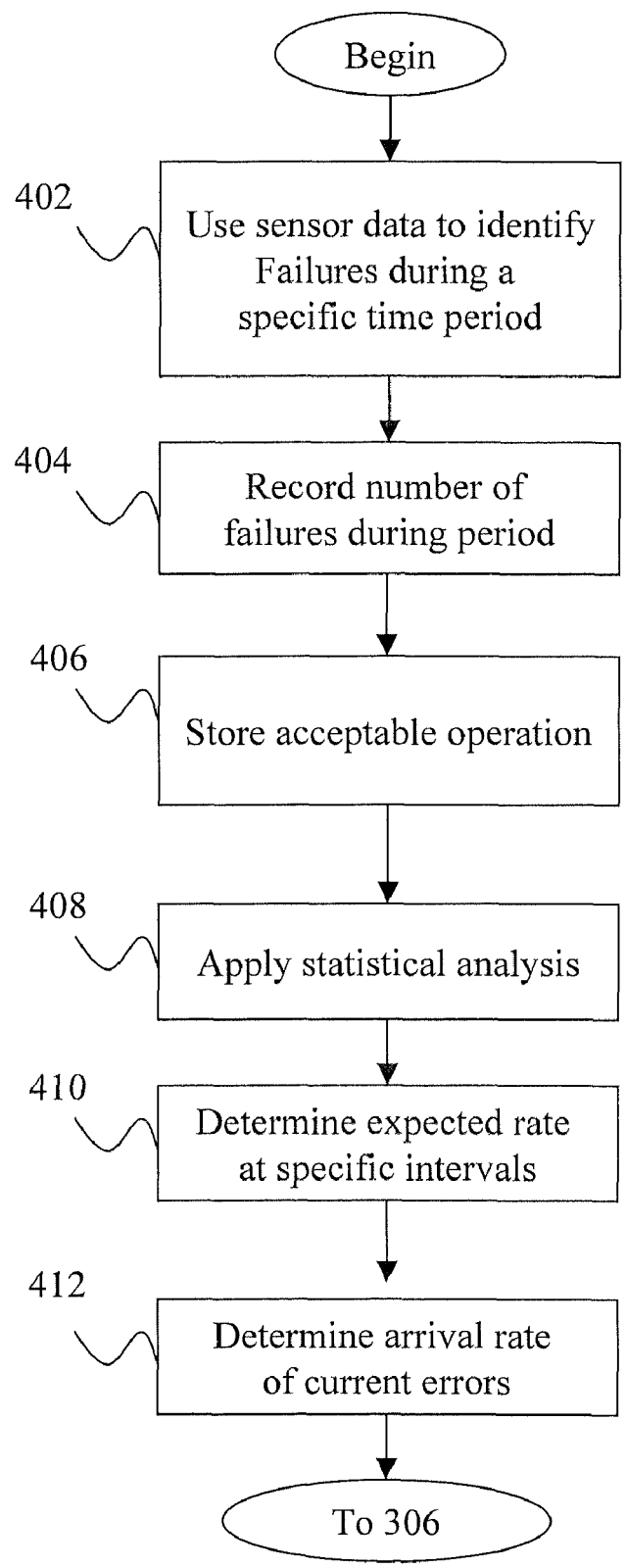
FIG. 4 shows a method of creating thresholds according to an embodiment of the present invention.

FIG. 4 shows a more detailed depiction of the method shown in FIG. 3. In particular, FIG. 4 shows processes that may be conducted in block 302 and block 304 of FIG. 3.

At a block 402 sensor data is collected by operating system to identify critical failures during a period. In one embodiment, the "sensors" may include information contained in Logrec entries, SVC dumps or SYSM dumps. At a block 404, the number of critical failures during the time period is recorded. The critical failure arrival rate may be either all failures or failures of a specific type or failures with a specific priority that could be calculated from a symptom string which defines the problem. In one embodiment, the system may keep only the samples from time periods when the system was operating acceptably as indicated at a block 406.

At a block 408 statistical analysis, like category area regression trees, may be used to divide the historical data into categories which minimize the variation to construct a model of expected arrival rate by time. The model created by the statistical analysis may be used determine the expected arrival rate of critical failures at specific intervals at a block 410. The time intervals could include but are not limited to, the previous hour, 24 hours ago, same time last week, and same time last month. Of course, the maximum or minimum or average of these values depending on the tolerance for false positive and missed events could be used. In more detail, this block may include applying the appropriate statistical technique to get the desired certainty that the results are different. For failures, the arrival rate is usually Poisson so a threshold with the desired certainty that the value is abnormal may be obtained, in one embodiment, by multiplying the arrival rate by the appropriate value. Standard statistical techniques may be employed to determine the appropriate value. In some embodiments, particular failures may be more important than others. As such, in one embodiment, the different failure types may be weighted against the threshold more than others.

In one embodiment, at a block 304 (from FIG. 3) the arrival rate of current failures may be determined. In one embodiment, this may include using a sliding window determine what the arrival rate is during the last hour and compare that to the threshold at block 306.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method, the computer including a processor having a software stack accessed by multiple application programs, the method comprising:

receiving software requests from the multiple applications at the software stack;

monitoring a rate of soft failures at the software stack via a stack monitor;

comparing the rate of soft failures with a time related threshold, the time related threshold being based on a time of day;

generating an alarm when the rate of soft failures exceeds the time related threshold; and creating the time related threshold, wherein creating the time related threshold includes:

identifying soft failures during a particular time period at a particular time of day;

recording a number of soft failures during the particular time period;

storing acceptable operation soft failure rates during the particular time period; and applying a statistical analysis to the acceptable operation soft failure rates to create expected acceptable operation soft failure rates at specific intervals, the statistical analysis including multiplying the acceptable operation soft failure rates by a Poisson distribution value.

2. The method of claim 1, wherein the stack soft failures are memory access failures.

3. The method of claim 1, wherein the stack soft failures are buffer overruns.

4. The method of claim 1, wherein monitoring includes examining contents of a system dump.

5. A computer system for monitoring software stack failures, the system comprising:
- a stack configured to be accessed by multiple application programs and to provide access to resources of the computer system to the multiple programs;
- a stack monitor coupled to the stack configured to monitor a rate of soft failures;
- a memory unit containing time based historical failure rate information, the time based historical failure rate information including a time based historical rate; and
- a system monitor coupled to the stack monitor and the memory unit and configured to compare the rate of soft failures with the time based historical rate and to generate an alarm when the rate of soft failures exceeds the time based historical rate, the time based historical rate being based on a time of day, wherein the system monitor is also configured to create the time based historical rate by identifying soft failures during a particular time period, recording a number of soft failures during the particular time period, storing acceptable operation soft failure rates during the particular time period in the memory unit, applying a statistical analysis to the acceptable operation soft failure rates to create expected acceptable operation soft failure rates at specific intervals, and storing the expected acceptable operation soft failure rates as the time based historical rates in the memory unit, wherein the statistical analysis includes multiplying the acceptable operation soft failure rates by a Poisson distribution value.

6. The system of claim 5, wherein the soft failures are memory access failures.

7. The system of claim 5, wherein the soft failures are buffer overruns.

8. The system of claim 5, wherein the stack monitor receives system dumps from the stack and examines contents of system dumps to determine the rate of soft failures.

* * * * *